Nov. 3, 1970  R. L. ROBINSON, JR  3,538,327
FIXED GEOMETRY TEST SOURCE ASSEMBLY FOR GAS
FLOW PROPORTIONAL COUNTERS
Filed Nov. 29, 1967  2 Sheets-Sheet 2

INVENTOR
RICHARD L. ROBINSON, JR.

BY *Melvin L Crane* AGENT

*R Robinson* ATTORNEY

3,538,327
FIXED GEOMETRY TEST SOURCE ASSEMBLY FOR GAS FLOW PROPORTIONAL COUNTERS
Richard L. Robinson, Jr., Washington, D.C., assignor to the United States of America as represented by the Secretary of the Navy
Filed Nov. 29 1967, Ser. No. 686,438
Int. Cl. G01n 23/12
U.S. Cl. 250—43.5        7 Claims

ABSTRACT OF THE DISCLOSURE

This invention is directed to an assembly which will enable a radioactive test source to be exposed for detection of a radioactive gas or for low energy counting in a gas flow proportional counter without altering any operating parameters of the test chamber such as volume, pressure, temperature, composition of the filling and surface area within the chamber.

---

The invention described herein may be manufactured and used by or for the Government of the United States of America for govenmental purposes without the payment of any royalties thereon or therefor.

This invention relates to a device for detecting radioactive gas especially for low energy beta and alpha particles.

Heretofore gas flow proportional counters have been used in measuring conventional solid samples or smear counting in which changes in volume, pressure, temperature or composition of filling is not critical. Also, when the energy being detected is sufficiently high the above parameters are not critical. Therefore prior art devices are not suitable for detecting and determining extremely low energy beta particles.

It is therefore an object of the present invention to provide a device which enables one to combine a radioactive gas with a counting gas for measurement of the activity of the radioactive gas.

Another object is to provide a device in which a combined radioactive gas and a counting gas admitted into a proportional counter is subjected to a known beta emitting source without changing any operating parameters, such as pressure, temperature, volume or composition of the filling.

Still another object is to provide a device which is simple in operation to positively determine beta or gamma activity in a radioactive gas.

Figure 1:
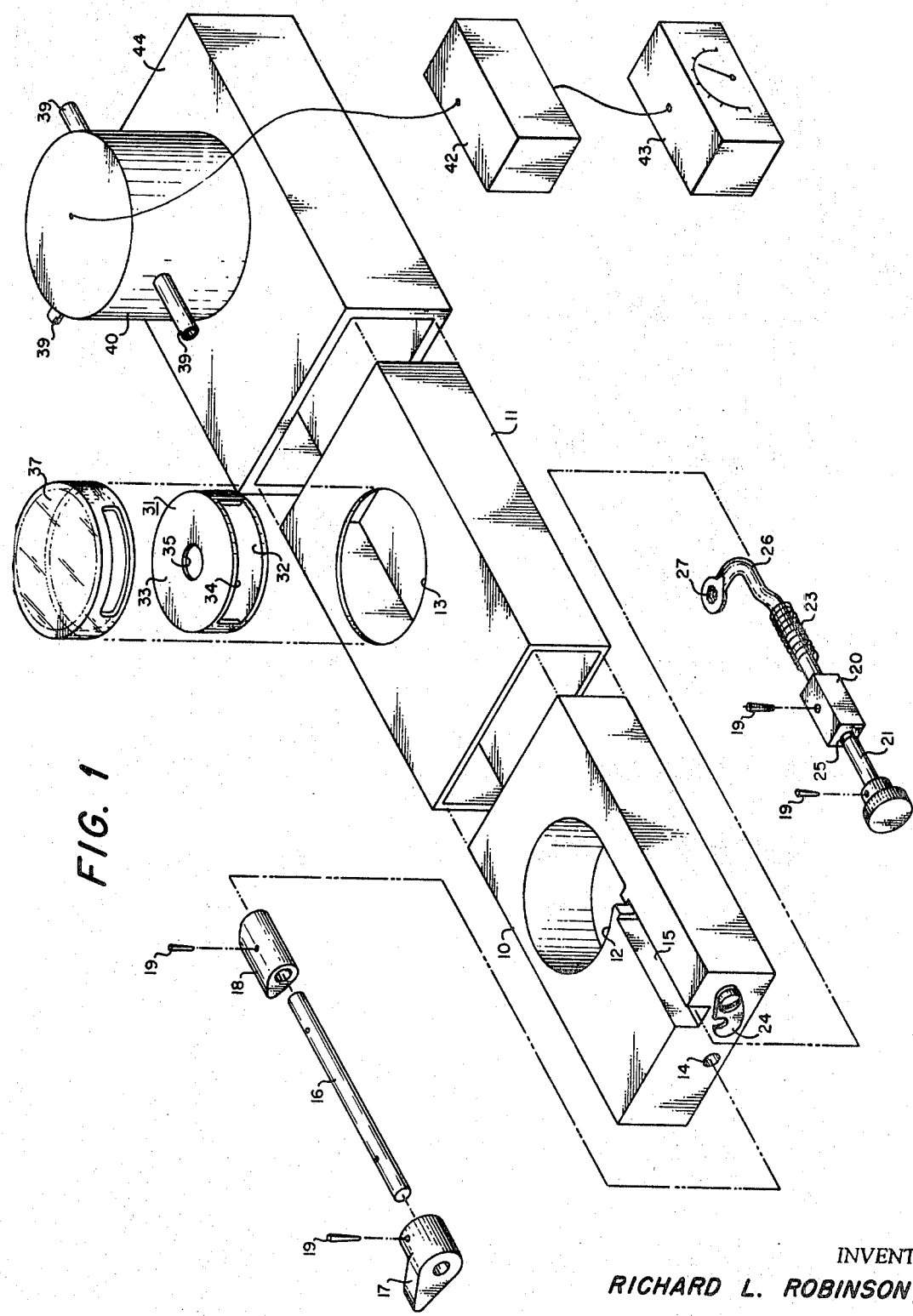
Figure 2:
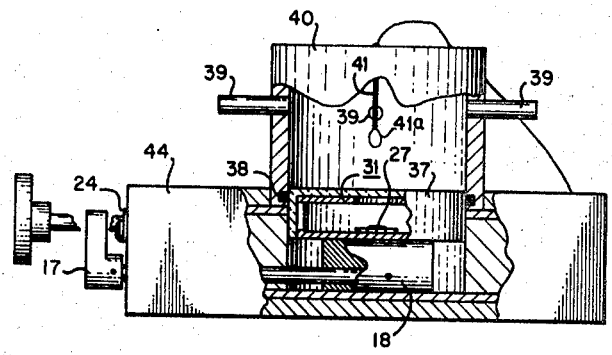

Other objects and advantages of the invention will become apparent from the following detailed description, in which:

FIG. 1 is an exploded view of the elements to illustrate their relationship, and FIG. 2 is a partial cross-sectional view of the device in an assembly.

It is well known in the art that the accuracy of determining low energy activity of a radioactive gas in a gas flow proportional counter depends a lot in the background. Therefore, the determination made is subject to change by a change in humidity, volume, pressure, temperature and by the composition of the gas filling. In order to determine whether the counter is counting background or actually detecting low energy particles in the sample, it is advantageous to subject the counting gas to a known beta emitting source. By detection of the beta paricles from the known beta source a determination of the beta activity in the counting gas may be made. The device of this invention permits one to measure a radioactive gas without being subjected to the known beta emitting source and then by moving a known beta source to emit beta into the gas, a measurement may be made of the known activity and the unknown activity. This is done without affecting any of the operating parameters such as volume, pressure, temperature or composition of the gas filling.

Now referring to the drawing, wherein like reference characters refer to like parts throughout, there is shown by illustration a device made in accordance with the teaching of this invention. As shown, the device includes a rectangular base assembly including a solid rectangular block 10 that fits within a rectangular housing 11 with a tight fit. The rectangular block has a hole 12 therethrough and the upper surface of the rectangular housing has a hole 13 therethrough that matches the hole 12 in the solid rectangular block. The bottom surface of the housing closes off the hole 12 to provide a bottom therefor. A hole 14 is bored into one end of the solid block on the centerline thereof parallel with the sides such that the hole 14 extends to the cavity 12. The upper surface of the solid block is provided with a slot 15 therein near one edge wherein the slot extends from the end to the outer-portion of the cavity 12 parallel with the side of the block. A rod 16 having a handle 17 on the outer end extends through the hole 14 to the center of cavity 12 and is provided with a cam element 18 on the inner end thereof such that the cam is operative along the axis of the cavity 12. The handle and cam are held in place by suitable pins 19. A rod 21 is held in the slot 15 by the upper surface of the housing 11 to allow free longitudinal movement of the rod 21 within the slot. A spring 23 is placed around the rod 21 and presses against guide block 20 in order to spring load the rod for movement within the slot. A lever catch 24 is secured to the end of the solid block near the rod 21 and is rotatable relative to the rod to fit within a groove 25 in the end of the rod to hold the rod in place against the load of the spring loaded spring. The inner end of the rod 21 is provided with an arm 26 at an angle thereto so that the arm extends toward the center of the cavity 12. The length of rod 21 is such that when the rod 21 is secured in place by use of catch 24 the arm 26 extends to the center of the cavity. The inner end of the arm has an alpha or beta emitting source 27 secured on the upper surface thereof so that when the rod is held in place by the catch, the beta emitting source is coaxial with the cavity 12. A cylindrical member 31 having an outer diameter which is less than the diameter of cavity 12 is provided with a bottom 32 and a top 33 separated by a cylindrical skirt extending from the bottom. The cylindrical member is placed into the cavity 12 with the bottom downwardly such that the bottom rests upon the cam 18 on the end of the rod 16. Thus, when the rod is rotated by the handle 17, the cam lifts or lowers the cylindrical element. The cylindrical element is provided with a slot 34 in the skirt near the outer surface of the base within which rod 21 fits to permit axial movement of the cylindrical member within the cavity along the axis of the cavity through rotation of the cam 18. The top 33 is formed of a metal which prevents passage of alpha and beta particles and has an opening 35 on the axis of the cylindrical member. This opening is closed by use of a thin window 37 such as lithium fluoride or any other suitable thin window. The window covered opening in the metal top exposes the alpha or beta source on arm 26 when the rod is held in place by the locking catch. Thus, when the rod 21 is in one position the beta source is behind the metal cover which prevents the beta particles from passing through the top. When the beta source is positioned below the window in the metal top on the axis of the cavity and cylindrical member, beta particles emerge through the window to the area above the top.

The rectangular base assembly has been described as formed of a solid rectangular block and a housing within which it fits. This construction provides an easy method of assembly to form cavity 12 and to secure the spring loaded beta source arm in place. However, it will be obvious to others that the assembly could be made of a single solid block with the spring loaded beta source held in place by any suitable means. One important thing is that the source is movable so that it is exposed through the window or either it is held in position such that it is not exposed. Another important fact is that the cylindrical element be movable such that it can be moved into and out of sealing engagement with the open end of a gas flow proportional chamber. Also, the dimensions are such that the size of the assembly is the same as the drawers used with a well known detector unit as set forth below.

It has been indicated above that the cam moves the cylindrical member up and down along the axis of the cavity. This is for the purpose of inserting the covered end of the cylindrical member into the open end of a gas flow proportional counter. The skirt end of the cylindrical member that extends into the gas flow proportional counter is surrounded by an O-ring 38 about the outer surface to insure a good seal between the housing of the gas flow proportional counter and the movable cylindrical member.

The operation and electronics of the gas flow proportional counter are well known in the art and have been used heretofore for counting purposes. Such equipment is a counter model PC-3A or PC-3B manufactured by the Nuclear Measurements Corporation. The gas flow proportional counter, as shown includes an open ended housing 40 having an axially disposed electrode 41 extending through the closed end into the area confined by the housing and which includes a small wire loop 41a on the end. The center electrode is connected to a suitable electrical circuitry 42 and a read-out 43 in order to determine the alpha or beta activity within the gas within the counter. The counter chamber is provided with three gas flow lines 39 for admitting and withdrawing the gas.

In operation of one example to carry out the invention, the base assembly is formed as set forth above with the cam operated rod, the beta source holder and window arrangement all in place. The rectangular base assembly slides along brackets into a housing 44 on which the gas flow proportional counter chamber is mounted with the open end of the counter chamber directed normal with the slot within which the base is slid. The base assembly is formed of a length such that the cavity 12 in the base assembly will be positioned coaxial with the gas flow proportional counter chamber when the base is slid into the housing to its fullest extent. Once the base assembly is positioned in place, the handle on rod 16 is rotated 90 degrees so that the cam on the end thereof forces the cylindrical element into the open end of the proportional counter and holds the cylindrical element in place by its position. The proportional counter is purged and the electronics are activated. The proportional counter chamber is filled with a counting gas such as (90% Argon and 10% Methane), that is, a gas which is ionized by a particle passing through the gas. The counting gas lowers the ionization potential of the gas flow proportional chamber such that low energy particles may be detected.

The counting gas is admitted until the chamber is saturated, then the read-out indication is recorded to record any background count that may be prevalent. The beta source is then moved to the area below the window to expose the counting gas to the beta source. Once the beta soucre is exposed, another count is taken an recorded. The beta source is now withdrawn from exposure. The operator now determines an operating ratio of counting gas to a radioactive gas. Once the ratio is chosen, that amount of counting gas and an amount of atmospheric air equivalent to the chosen part of radioactive gas is admitted to the air flow proportional counter chamber. With the counting gas and atmospheric air mixture within the counter chamber, a reading is taken and recorded. The beta source is now moved to a position below the window to expose the counting gas-atmospheric air mixture to the beta source. The count read-out is noted and recorded. If the count read-out is not the same as it was previously with only the counting gas in the tube the electronics are adjusted to obtain the same count previously recorded for the counting gas only. This adjustment sets the electronic readout equipment such that any effects from the atmospheric air will be ignored during further testing for the energy due to particles within a radioactive gas. The test source is withdrawn from the area of the window. Thus, the count recorded with the counting gas-atmospheric air in the proportional counter chamber establishes a background count.

Now the air in the counting gas mixture is replaced with a radioactive gas to be measured for radioactivity. The radioactive gas is introduced to provide the same radioactive gas-counting gas ratio as the previously determined and checked ratio of counting gas-atmospheric air. Once the air is replaced by the radioactive gas, a count of the radioactive gas-counting gas mixture is taken and the read-out value is recorded. Expose the radioactive gas-counting gas mixture to the beta source. Take a count of the gas mixture with the gas mixture exposed to the source and record the read-out value. The read-out value due to the beta source to which the gas mixture is exposed is known since it was previously obtained; therefore, the difference between the read-out of the count due to the exposed test source and that without the test source is an indication of the actual counts due to the radioactive gas in the mixture. Withdrawal of the source from exposure to the gas mixture and then taking another read-out of the counts without the beta source exposure, gives a positive check to be sure that some of the parameters have not changed during the determination of radioactivity from the radioactive gas.

By following the steps of checking the readout, for (1) counting gas alone, (2) counting gas-atmospheric air mixture and (3) the counting gas-radioactive gas mixture, each of which are exposed and unexposed to the known beta source in each instance, provides an accurate count for the radioactive gas since the steps taken determine a background count which may be subtracted from the total count. Thus, day-by-day differences in humidity, temperature change, etc., are taken into consideration to provide an accurate count of the radioactivity of the desired gas.

The above described method of use of the device set forth herein provides a simple useful way of studying tritiated water vapor, Argon 41 or tritium in air.

Thus, it is seen that the base assembly disclosed herein is useful to move a low energy test source into and out of position for exposure to facilitate the determination of a radioactive gas in a gas flow proportional counter.

It will be obvious to others skilled in the art that other test sources may be moved into and out of exposure by use of the same arrangement.

It is to be noted that the cylindrical member 31 is movable axially such that the cover is even with the upper surface of the base when in the down position such that the upper surface of the base will slide under the open end of the counter with a close clearance. Thus, the moveable member requires only a small movement upward in order to seal the open end of the gas flow proportional counter. Further it is to be noted that the proportional counter may be made as an integral part of the housing or may be separate requiring hold down means to hold the counter in place relative to the cylindrical member which is forced into the chamber by the cam.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States:

1. In an improved gas flow proportional counter tube which comprises an open ended cylindrical housing, an electrode extending into the closed end coaxial with said housing, at least one gas inlet and one gas outlet, the improvement including:
   a cylindrical end closure in axial alignment with said cylindrical housing,
   means for extending said cylindrical end closure into the open end of said gas flow proportional counter in a gas tight seal,
   a particle emitting radioactive source associated with said end closure,
   means for shielding said particle emitting source from exposure to any gas within said gas flow proportional chamber and
   means for exposing said particle emitting source to any gas in said gas proportional counter without affecting the volume, pressure, temperature or composition of gas filling within said gas flow proportional counter.

2. In an improved gas flow proportional counter as claimed in claim 1, in which:
   a cover on said cylindrical end closure is formed of a material that blocks alpha and beta radiation,
   said cover having an axial opening therethrough,
   a window,
   said window being secured over said opening in said cover and made of a material to permit passage of radiation therethrough,
   and means for moving said particle emitting source into alignment with said window and also out of the view of said window.

3. In an improved gas flow proportional counter as claimed in claim 1, in which:
   said particle emitting source is a low energy beta source.

4. An assembly for exposing a counting gas within a gas flow proportional counter to a radioactive source without altering the volume, pressure, temperature or composition of the gas filling, which comprises:
   a rectangular base assembly,
   said base assembly including, top, bottom, side, and end surfaces,
   a cylindrical cavity in said top surface with the axis of said cavity normal to the top surface,
   a cylindrical element within said cavity,
   said cylindrical element being closed on the bottom and open at the top,
   means associated with said cylindrical element for producing axial movement of said cylindrical element to move the upper end of said element into an open end of said gas flow proportional chamber,
   a radioactive source,
   means for mounting said radioactive source within said cylindrical element,
   an alpha and beta radiation impervious cover on said cylindrical element,
   said cover including an aperture,
   a window secured over said aperture in said cover and made of a material that admits radiation from said radioactive source,
   means for moving said radioactive source to a position below said window and out from under said window in the area confined by the bottom of said cylindrical element and the cover over said cylindrical element.

5. An assembly as claimed in claim 4, in which:
   said radioactive source is a low energy beta source.

6. In an assembly as claimed in claim 5, in which:
   said means upon which said beta source is mounted for movement under said window is spring loaded, and
   means for securing said beta source in a position under said window.

7. In an assembly as claimed in claim 4, wherein, said aperture in said window is on the axis of said cylindrical cavity and said cylindrical element.

References Cited
UNITED STATES PATENTS 2,761,071    8/1956    Hurst.
3,155,829   11/1964    Frank.

ARCHIE R. BORCHELT, Primary Examiner

U.S. Cl. X.R.

250—44, 83.6; 313—54